(12) United States Patent
Schwengler et al.

(10) Patent No.: US 11,187,158 B2
(45) Date of Patent: Nov. 30, 2021

(54) GEARING ARRANGEMENT AND METHOD FOR MANUFACTURING THE GEARING ARRANGEMENT

(71) Applicant: Rolls-Royce Deutschland Ltd & Co KG, Blankenfelde-Mahlow (DE)

(72) Inventors: Jonas Schwengler, Berlin (DE); David Krueger, Potsdam (DE); Michael Nique, Berlin (DE)

(73) Assignee: ROLLS-ROYCE DEUTSCHLAND LTD & CO KG, Blankenfel de-Mahlow (DE)

( * ) Notice: Subject to any disclaimer, the term of this patent is extended or adjusted under 35 U.S.C. 154(b) by 100 days.

(21) Appl. No.: 16/459,103

(22) Filed: Jul. 1, 2019

(65) Prior Publication Data

US 2020/0025103 A1 Jan. 23, 2020

(30) Foreign Application Priority Data

Jul. 20, 2018 (DE) ..................... 10 2018 212 160.5

(51) Int. Cl.
| | |
|---|---|
| *F02C 7/36* | (2006.01) |
| *F01D 25/34* | (2006.01) |
| *F02K 3/06* | (2006.01) |
| *F16H 1/28* | (2006.01) |
| *F16H 57/023* | (2012.01) |
| *F16H 57/08* | (2006.01) |

(52) U.S. Cl.
CPC ................ *F02C 7/36* (2013.01); *F01D 25/34* (2013.01); *F02K 3/06* (2013.01); *F16H 1/28* (2013.01); *F16H 57/023* (2013.01); *F16H 57/08* (2013.01); *F05D 2220/32* (2013.01); *F05D 2260/40311* (2013.01); *F16H 2001/289* (2013.01)

(58) Field of Classification Search
CPC combination set(s) only.
See application file for complete search history.

(56) References Cited

U.S. PATENT DOCUMENTS

| | | | |
|---|---|---|---|
| 3,459,072 A | 8/1969 | Shannon et al. | |
| 5,433,674 A | 7/1995 | Sheridan et al. | |
| 10,683,773 B2 * | 6/2020 | Savaria | ..................... F02C 7/36 |
| 10,975,717 B2 * | 4/2021 | Moniz | ..................... F01D 17/04 |

(Continued)

OTHER PUBLICATIONS

German Search Report dated May 8, 2019 from counterpart German App No. 102018212160.5.

(Continued)

*Primary Examiner* — Binh Q Tran
(74) *Attorney, Agent, or Firm* — Shuttleworth & Ingersoll, PLC; Timothy Klima

(57) ABSTRACT

A gearbox assembly for a gas turbine engine comprises a planetary gearbox having at least one ring gear and at least one planet gear, which exerts a force on the ring gear in the direction of a force vector as it rolls on said ring gear; and a holding device for fastening the at least one ring gear on another structure, having a first section, which extends in the axial direction on one side of the force vector and/or of a straight-line extension thereof, and having a second section, which extends in the axial direction on the other side of the force vector and/or of the straight-line extension thereof. A gas turbine engine and a method for producing a gearbox assembly are furthermore made available.

15 Claims, 5 Drawing Sheets

(56) References Cited

U.S. PATENT DOCUMENTS

| | | |
|---|---|---|
| 2011/0130246 A1 | 6/2011 | McCune et al. |
| 2016/0097330 A1 | 4/2016 | Venter |
| 2016/0097331 A1 | 4/2016 | Venter et al. |
| 2016/0376984 A1* | 12/2016 | Sheridan .................. F02C 7/36 60/805 |
| 2017/0082031 A1* | 3/2017 | Miller ................. F16H 57/0006 |
| 2017/0108110 A1 | 4/2017 | Sheridan |
| 2018/0334964 A1* | 11/2018 | Desjardins ............... F02C 7/06 |
| 2019/0128182 A1* | 5/2019 | Schwarz ............... F04D 29/059 |

OTHER PUBLICATIONS

European Search Report dated Nov. 18, 2019 for counterpart European Patent Application No. 19182984.5.

* cited by examiner

GEARING ARRANGEMENT AND METHOD FOR MANUFACTURING THE GEARING ARRANGEMENT

This application claims priority to German Patent Application DE102018212160.5 filed Jul. 20, 2018, the entirety of which is incorporated by reference herein.

The present disclosure relates to a gearbox assembly, to a gas turbine engine and to a method for producing a gearbox assembly according to the present disclosure.

To transmit high torques, use is often made of gearbox assemblies which comprise a planetary gearbox mounted on a loadbearing structure by means of a holding device. Planetary gearboxes can be employed as reduction gearboxes in order, for example, to use a high-speed shaft of a gas turbine engine to drive a fan at a lower speed. This allows a particularly large diameter of the fan despite a high speed of a turbine driving the shaft.

In order to withstand loads during operation over the long term, planetary gearboxes of gas turbine engines, in particular, are of correspondingly massive construction. However, a high weight can lead to increased fuel consumption if the gas turbine engine is used in an aircraft, for example.

It is the object of the present invention to provide an improved gearbox assembly having a planetary gearbox.

According to one aspect, a gearbox assembly for a gas turbine engine is made available, comprising a planetary gearbox or epicyclic gearbox and a holding device. The planetary gearbox comprises at least one ring gear and at least one planet gear, wherein the planet gear exerts a force on the ring gear in the direction of a force vector as it rolls on said ring gear. The holding device is designed for fastening the at least one ring gear on another structure, e.g. a fixed supporting structure of the gas turbine engine. It is envisaged here that the holding device has a first section and a second section, wherein the first section extends in the axial direction on one side of the (resultant) force vector and/or of a straight-line extension thereof (in particular exclusively), and the second section extends in the axial direction on the other side of the force vector and/or of the straight-line extension thereof (in particular exclusively). In particular, provision can be made for the first section to extend in a cross-sectional area along a central axis of the ring gear on one side of the force vector and/or of a straight-line extension thereof projected onto the cross-sectional area, and for the second section to extend on the other side.

A gearbox assembly designed in this way is improved especially inasmuch as particularly balanced loading of the ring gear by the planet gears is possible. As a result, the ring gear and the planet gears are uniformly loaded and the tooth stress can be reduced. This enables an increased service life and/or a reduced weight.

The first and the second section can each have (in particular in relation to the cross-sectional area along the central axis of the ring gear) a rotational stiffness, wherein the ratio of these rotational stiffnesses is 1.0+/−0.2, in particular 1.0+/−0.1, in particular 1.0+/−0.05, in particular 1.0. The rotational stiffnesses can therefore be identical or substantially identical. It is thereby possible for an elastic deformation of the ring gear due to the force exerted by the planet gear to take place only in the radial direction and only insignificantly or not at all in the axial direction. This enables particularly uniform loading.

In one embodiment, the first section connects the at least one ring gear to the second section. As an option, the first section is connected or can be connected via the second section to the other structure.

The planetary gearbox can have helical gearing, in particular double helical gearing, e.g. herringbone gearing. Alternatively, however, spur gearing is also conceivable. A helically toothed ring gear of a planetary gearbox is subject to forces which could lead to tilting of the ring gear in cross section. As a result, the teeth of the planet gears and of the ring gear would not be aligned optimally with respect to one another, and this could result in increased tooth loading. Particularly in combination with identical or substantially identical rotational stiffnesses of the first and second sections of the holding device, such tilting can be counteracted.

As an option, the planetary gearbox is provided with double helical gearing such that the axial forces are directed outwards as the at least one planet gear rolls on the ring gear. As a result, lubricant can simply be squeezed out, for example.

To decouple loads, the holding device can provide a flexible suspension for the ring gear. The flexible suspension allows movement of the planetary gearbox relative to the other structure, e.g. the fixed supporting structure of the gas turbine engine, in the case of load changes, for example.

As an option, the first and the second section are formed integrally with one another or, as an alternative, are of multi-piece design and fastened to one another.

The first and the second section can have different material thicknesses and/or can be produced from different materials. It is thereby possible (e.g. depending on the position of the force vector) to obtain identical or substantially identical rotational stiffnesses, despite optional differences in the lengths of the first and the second section.

One aspect relates to an engine, in particular for an aircraft, comprising a core shaft, a fan having a plurality of fan blades; and at least one gearbox assembly according to any of the embodiments described herein, having a planetary gearbox, which can be driven by the core shaft, wherein the fan can be driven at a lower speed than the core shaft by means of the planetary gearbox. The engine is a gas turbine engine, for example, or an electrically driven engine (e.g. an E fan).

One aspect relates to a gas turbine engine for an aircraft, comprising a core engine which comprises a turbine, a compressor and a core shaft connecting the turbine to the compressor; a fan which is positioned upstream of the core engine, wherein the fan comprises a plurality of fan blades; and a gearbox assembly according to any of the embodiments described herein, having a planetary gearbox, which can be driven by the core shaft, wherein the fan can be driven at a lower speed than the core shaft by means of the planetary gearbox.

In the gas turbine engine, the turbine can be a first turbine, the compressor can be a first compressor and the core shaft can be a first core shaft. As an option, the core engine further comprises a second turbine, a second compressor, and a second core shaft connecting the second turbine to the second compressor; and the second turbine, the second compressor, and the second core shaft are arranged to rotate at a higher speed than the first core shaft.

As noted elsewhere herein, the present disclosure may relate to a gas turbine engine, e.g. an aircraft engine. Such a gas turbine engine may comprise a core engine comprising a turbine, a combustor, a compressor, and a core shaft connecting the turbine to the compressor. Such a gas turbine engine may comprise a fan (with fan blades) which is positioned upstream of the core engine.

The gas turbine engine can comprise a planetary gearbox which is driven via the core shaft and the output of which drives the fan in such a way that it has a lower speed than the core shaft. The input to the planetary gearbox may be directly from the core shaft, or indirectly via the core shaft, for example via a spur shaft and/or gear. The core shaft may be rigidly connected to the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The core engine may further comprise a second turbine, a second compressor, and a second core shaft connecting the second turbine to the second compressor. The second turbine, second compressor, and second core shaft may be arranged to rotate at a higher speed than the first core shaft.

In such an arrangement, the second compressor may be positioned axially downstream of the first compressor. The second compressor may be arranged to receive (for example directly receive, for example via a generally annular duct) a flow from the first compressor.

The planetary gearbox may be designed to be driven by the core shaft that is configured to rotate (for example in use) at the lowest speed (for example the first core shaft in the example above). For example, the planetary gearbox may be designed to be driven only by the core shaft that is configured to rotate (for example in use) at the lowest speed (for example only by the first core shaft, and not the second core shaft, in the example above). Alternatively, the planetary gearbox may be designed to be driven by one or more shafts, for example the first and/or second shaft in the example above.

In a gas turbine engine as described and/or claimed herein, a combustor may be provided axially downstream of the fan and compressor or compressors. For example, the combustor may be directly downstream of (for example at the exit of) the second compressor, where a second compressor is provided. By way of further example, the flow at the exit to the compressor may be fed to the inlet of the second turbine when a second turbine is provided. The combustor may be provided upstream of the turbine(s).

The or each compressor (for example the first compressor and the second compressor as described above) may comprise any number of stages, for example multiple stages. Each stage may comprise a row of rotor blades and a row of stator vanes, which may be variable stator vanes (i.e. the angle of incidence may be variable). The row of rotor blades and the row of stator vanes may be axially offset with respect to each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset with respect to each other.

Each fan blade may have a radial span extending from a root (or hub) at a radially inner gas-washed location, or from a 0% span position, to a tip with a 100% span position. The ratio of the radius of the fan blade at the hub to the radius of the fan blade at the tip may be less than (or on the order of) any of the following: 0.4, 0.39, 0.38, 0.37, 0.36, 0.35, 0.34, 0.33, 0.32, 0.31, 0.3, 0.29, 0.28, 0.27, 0.26 or 0.25. The ratio of the radius of the fan blade at the hub to the radius of the fan blade at the tip may be in an inclusive range bounded by two values in the previous sentence (i.e. the values may form upper or lower bounds). These ratios may commonly be referred to as the hub-to-tip ratio. The radius at the hub and the radius at the tip may both be measured at the leading edge (or axially forwardmost edge) of the blade. The hub-to-tip ratio refers, of course, to the gas-washed portion of the fan blade, i.e. the portion radially outside any platform.

The radius of the fan may be measured between the engine centerline and the tip of the fan blade at its leading edge. The diameter of the fan (which can generally be double the radius of the fan) can be larger than (or on the order of): 250 cm (approximately 100 inches), 260 cm, 270 cm (approximately 105 inches), 280 cm (approximately 110 inches), 290 cm (approximately 115 inches), 300 cm (approximately 120 inches), 310 cm, 320 cm (approximately 125 inches), 330 cm (approximately 130 inches), 340 cm (approximately 135 inches), 350 cm, 360 cm (approximately 140 inches), 370 cm (approximately 145 inches), 380 cm (approximately 150 inches), or 390 cm (approximately 155 inches). The fan diameter may be in an inclusive range bounded by any two of the values in the previous sentence (i.e. the values may form upper or lower bounds).

The speed of the fan may vary in operation. Generally, the speed is lower for fans with a larger diameter. Purely by way of non-limiting example, the speed of the fan under cruise conditions may be less than 2500 rpm, for example less than 2300 rpm. Purely by way of further non-limiting example, the speed of the fan under cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limiting example, the speed of the fan under cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at the leading edge multiplied by angular speed). The fan tip loading under cruise conditions can be more than (or on the order of): 0.3, 0.31, 0.32, 0.33, 0.34, 0.35, 0.36, 0.37, 0.38, 0.39, or 0.4 (wherein all units in this passage are $Jkg^{-1} K^{-1}/(ms^{-1})^2$).

The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core under cruise conditions. In the case of some arrangements, the bypass ratio can be more than (or on the order of): 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limiting example, the overall pressure ratio of a gas turbine engine as described and/or claimed herein at cruising speed can be greater than (or on the order of): 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. The specific thrust of an engine as described and/or claimed herein under cruise conditions can be less than (or on the order of): 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines can be particularly efficient in comparison with conventional gas turbine engines.

A gas turbine engine as described and/or claimed herein may have any desired maximum thrust. Purely by way of non-limiting example, a gas turbine as described and/or claimed herein can be capable of generating a maximum thrust of at least (or on the order of): 160 kN, 170 kN, 180 kN, 190 kN, 200 kN, 250 kN, 300 kN, 350 kN, 400 kN, 450 kN, 500 kN or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15° C. (ambient pressure 101.3 kPa, temperature 30° C.), with the engine static.

In use, the temperature of the flow at the entry to the high-pressure turbine may be particularly high. This temperature, which may be referred to as TET, may be measured at the exit to the combustor, for example immediately upstream of the first turbine vane, which itself may be referred to as a nozzle guide vane. At cruising speed, the TET can be at least (or on the order of): 1400 K, 1450 K, 1500 K, 1550 K, 1600 K or 1650 K. The TET at cruising speed may be in an inclusive range bounded by any two of the values in the previous sentence (i.e. the values may form upper or lower bounds). The maximum TET in the use of the engine can be at least (or on the order of), for example: 1700 K, 1750 K, 1800 K, 1850 K, 1900 K, 1950 K or 2000 K. The maximum TET may be in an inclusive range bounded by any two of the values in the previous sentence (i.e. the values may form upper or lower bounds). The maximum TET may occur, for example, at a high thrust condition, for example at a maximum take-off thrust (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fiber. By way of further example at least a part of the fan blade and/or aerofoil may be manufactured at least in part from a metal, such as a titanium based metal or an aluminum based material (such as an aluminum-lithium alloy) or a steel based material. The fan blade may comprise at least two regions manufactured using different materials. For example, the fan blade may have a protective leading edge, which is manufactured using a material that is better able to resist impact (for example from birds, ice or other material) than the rest of the blade. Such a leading edge may, for example, be manufactured using titanium or a titanium based alloy. Thus, purely by way of example, the fan blade may have a carbon-fiber or aluminum based body (such as an aluminum-lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disk). Purely by way of example, such a fixture may be in the form of a dovetail that may slot into and/or engage a corresponding slot in the hub/disk in order to fix the fan blade to the hub/disk. By way of further example, the fan blades may be formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disk by welding, such as linear friction welding.

The gas turbine engines described and/or claimed herein may or may not be provided with a variable area nozzle (VAN). Such a variable area nozzle may allow the exit area of the bypass duct to be varied in operation. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean the cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of descent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. In the case of some aircraft, the cruise condition can be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to the following: a forward Mach number of 0.8; a pressure of 23000 Pa; and a temperature of −55° C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In operation, a gas turbine engine described and/or claimed herein may operate at the cruise conditions defined elsewhere herein. Such cruise conditions may be determined by the cruise conditions (for example the mid-cruise conditions) of an aircraft to which at least one (for example two or four) gas turbine engine(s) may be mounted in order to provide propulsive thrust.

According to one aspect, a method for producing a gearbox assembly for a gas turbine engine, in particular a gearbox assembly according to any embodiment described herein, is made available. The method comprises the following steps (optionally but not necessarily in this order): making available a planetary gearbox having at least one ring gear and at least one planet gear, which exerts a force on the ring gear in the direction of a force vector as it rolls on said ring gear; and mounting a holding device for fastening the at least one ring gear on another structure in such a way on the at least one ring gear that a first section of the holding device extends in the axial direction on one side of the force vector and/or of a straight-line extension thereof, and a second section of the holding device extends in the axial direction on the other side of the force vector and/or of the straight-line extension thereof.

As an option, the method furthermore comprises the following step: determining a geometry, in particular material thicknesses, and/or material properties of the first and of the second section in an optimization procedure. During this procedure, it is possible, for example, for the position and spacing between the ring gear and the other structure and/or for torques acting on the at least one planet gear to be specified.

As an option, the optimization procedure comprises an FEM algorithm. This allows particularly efficient calculation and precise results.

In one embodiment, the optimization procedure is performed iteratively.

It is self-evident to a person skilled in the art that a feature or parameter described in relation to one of the above aspects can be applied to any other aspect, unless they are mutually exclusive. Furthermore, any feature or any parameter described here may be applied to any aspect and/or combined with any other feature or parameter described here, unless these are mutually exclusive.

Embodiments will now be described by way of example, with reference to the figures, in which.

Figure 1:
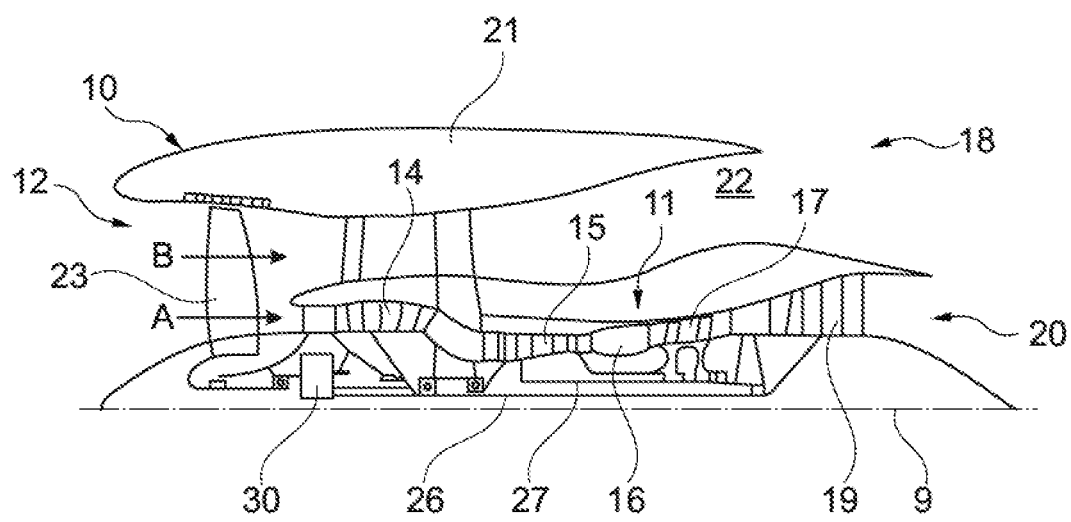
FIG. 1 shows a sectional side view of a gas turbine engine.

FIG. 1 illustrates a gas turbine engine 10 having a principal rotational axis 9. The gas turbine engine 10 comprises an air intake 12 and a fan 23 that generates two airflows: a core airflow A and a bypass airflow B. The gas turbine engine 10 comprises a core 11 that receives the core airflow A. When viewed in the order corresponding to the axial direction of flow, the core engine 11 comprises a low-pressure compressor 14, a high-pressure compressor 15, a combustion device 16, a high-pressure turbine 17, a low-pressure turbine 19 and a core thrust nozzle 20. A nacelle 21 surrounds the gas turbine engine 10 and defines a bypass duct 22 and a bypass thrust nozzle 18. The bypass airflow B flows through the bypass duct 22. The fan 23 is attached to and driven by the low-pressure turbine 19 via a shaft 26 and an epicyclic planetary gearbox 30.

In operation, the core airflow A is accelerated and compressed by the low-pressure compressor 14 and directed into the high-pressure compressor 15, where further compression takes place. The compressed air exhausted from the high-pressure compressor 15 is directed into the combustion device 16, where it is mixed with fuel and the mixture is combusted. The resultant hot combustion products then expand through, and thereby drive, the high-pressure and low-pressure turbines 17, 19 before being exhausted through the nozzle 20 to provide some propulsive thrust. The high-pressure turbine 17 drives the high-pressure compressor 15 by means of a suitable interconnecting shaft 27. The fan 23 generally makes available the majority of the propulsive thrust. The epicyclic planetary gearbox 30 is a reduction gearbox.

Note that the terms "low-pressure turbine" and "low-pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest speed in the engine (i.e. not including the gearbox output shaft that drives the fan 23). In some literature, the "low-pressure turbine" and "low-pressure compressor" referred to herein may alternatively be known as the "intermediate-pressure turbine" and "intermediate-pressure compressor". Where such alternative nomenclature is used, the fan 23 may be referred to as a first, or lowest pressure, compression stage.

The geometry of the gas turbine engine 10, and components thereof, is/are defined by a conventional axis system, comprising an axial direction (which is aligned with the rotational axis 9), a radial direction (in the bottom-to-top direction in FIG. 1), and a circumferential direction (perpendicular to the view in FIG. 1). The axial, the radial and the circumferential (tangential) directions are mutually perpendicular.

Figure 2:
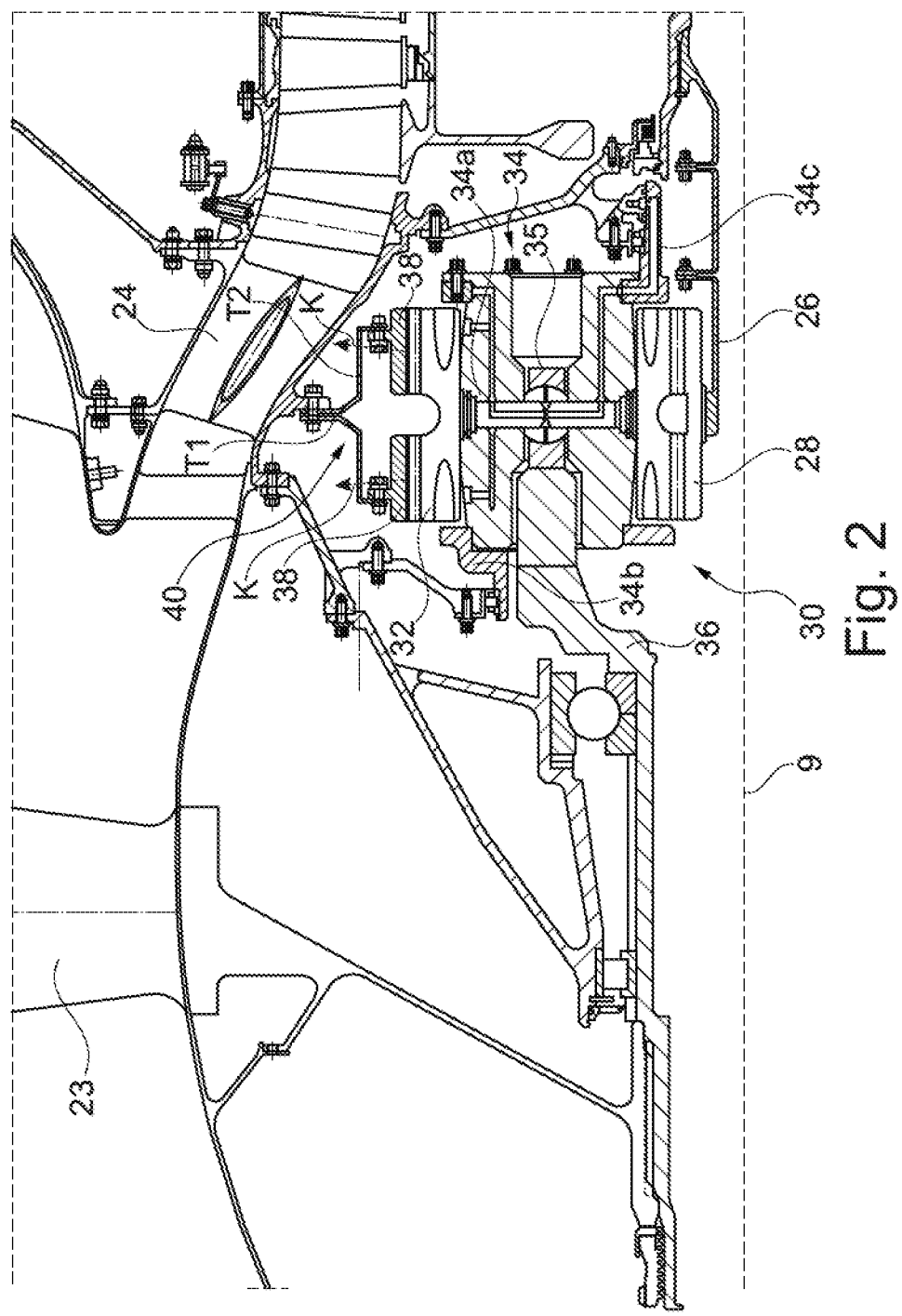
FIG. 2 shows a magnified sectional side view of an upstream section of the gas turbine engine with a gearbox assembly having a planetary gearbox.

An exemplary arrangement for a geared fan gas turbine engine 10 is shown in FIG. 2. The low-pressure turbine 19 (see FIG. 1) drives the shaft 26, which is coupled to a sun gear 28 of the epicyclic planetary gearbox 30 (or more generally of an epicyclic gear train). Radially outwardly of the sun gear 28 and intermeshing therewith is a plurality of planet gears 32 that are coupled together by a planet carrier 34. The planet carrier 34 guides the planet gears 32 in such a way that they precess around the sun gear 28 in synchronicity whilst enabling each planet gear 32 to rotate about its own axis.

In the present case, the planet carrier 34 comprises a bearing pin 34a, which is framed by a front planet carrier plate 34b and a rear planet carrier plate 34c. The planet carrier 34 is connected to a linkage 36 by means of a spherical bearing 35 and a spherical bearing unit mounted therein (for the compensation of tilting movements). The planet carrier 34 is coupled via the linkage 36 to the fan 23 in order to drive its rotation about the engine axis 9. The linkage 36 is thus designed to transmit torque.

Radially outwardly of the planet gears 32 and intermeshing therewith is an annulus or ring gear 38. In the present case, the planetary gearbox 30 comprises two ring gears 38. Each of the two ring gears 38 is situated radially outwardly of the planet gears 32 and intermeshes therewith, in the present case with two axially spaced, toothed sections of the individual planet gears 32.

The two ring gears 38 are spaced apart in the axial direction. The ring gears 38 are coupled non-rotatably, via a holding device 40, to another structure, namely a fixed supporting structure 24 of the gas turbine engine 10. The fixed supporting structure 24 is connected in a fixed manner to the engine nacelle 21, for example. The holding device 40 is used as a ring gear carrier.

The planetary gearbox 30 and the holding device 40 together form a gearbox assembly.

The holding device 40 is of annular design, for example, and surrounds the ring gears 38 at the respective outer circumferences thereof. By virtue of this embodiment of the holding device 40, the ring gears 38 cannot be moved (or can be moved only to an insignificant extent) in the circumferential direction around the main axis of rotation 9, that is to say are mounted non-rotatably on the fixed supporting structure 24, as already mentioned. In relation to the radial and/or axial direction, the holding device 40 provides a flexible suspension for the ring gears 38. Thus, the ring gears 38 can be moved radially and/or axially relative to the fixed supporting structure 24 by effective forces. In the radial and/or axial direction, the ring gears 38 can be moved to a significantly greater extent relative to the fixed supporting structure 24 than in the circumferential direction. It is thereby possible to accommodate loads during the operation of the gas turbine engine 10, e.g. those due to load changes or thermal expansion or contraction of individual components. The planetary gearbox 30 is decoupled from loads by the holding device 40.

The planetary gearbox 30 has helical gearing. In the present case, the two ring gears 38 (and, correspondingly, the respective sections of the planet gears 32 that intermesh therewith) have opposed helical gearing. In this case, the teeth are aligned in such a way that, in the course of the rolling action during the operation of the gas turbine engine 10, they first of all make contact axially on the inside and the tooth contact runs axially outwards (not towards one another). It is thereby possible to discharge lubricating oil in a simple manner.

As illustrated by means of FIG. 2, the holding device 40 is of two-part design in the present case. In this case, one of the two ring gears 38 is mounted on each of the two parts T1, T2. For this purpose, an externally encircling flange is formed on each of the ring gears 38, being fastened on a flange of a part T1, T2 of the holding device 40, to be specific being screwed thereto. In the example shown, the two parts T1, T2 of the holding device 40 are of identical construction (and arranged mirror-image fashion relative to one another). The two parts T1, T2 of the holding device 40 are mounted by means of flanges in mutual contact on a flange of the fixed supporting structure 24, to be specific being screwed thereto.

During the operation of the gas turbine engine 10, the planet gears 32 exert forces on the ring gears 38, and these forces have an axial component by virtue of the helical gearing. In FIG. 2, the directions of the resulting force vectors K are illustrated by dashed arrows and point away from each other in the axial direction. From FIG. 2, it can be seen that each of the two parts of the holding device 40 has a (first) section, which (in the cross-sectional plane containing the central axis of the respective ring gear 38) is arranged on one side of the force vector K or of a straight-line extension thereof in the axial direction (in relation to the central axis of the ring gear 38, which here coincides with the main axis of rotation 9), and a second section, which is arranged on the other side of the force vector K or of the straight-line extension thereof in the axial direction. This design allows particularly balanced mounting of the ring gears 38.

Figure 3:
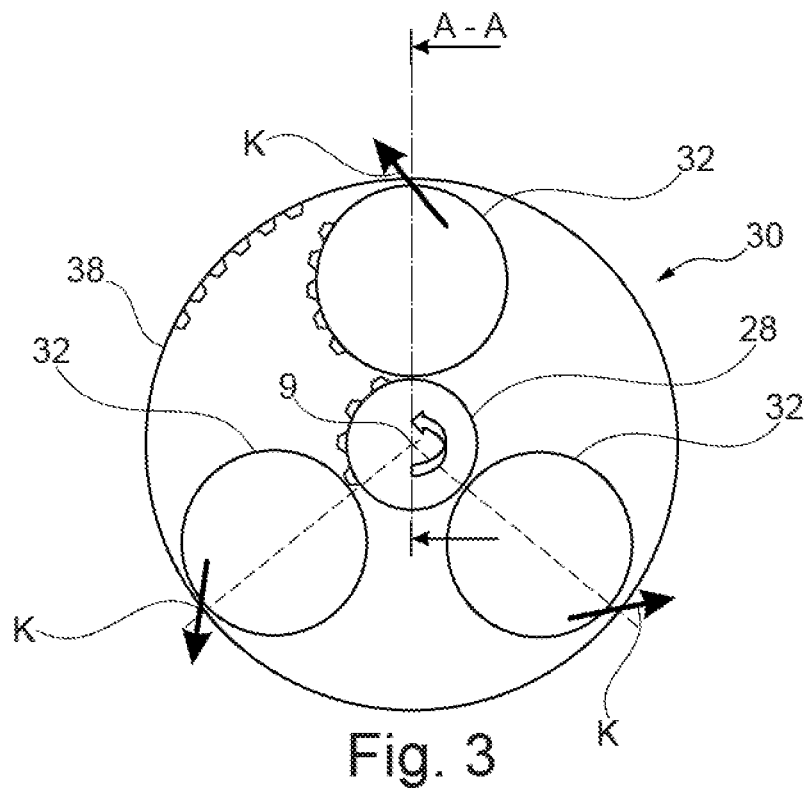
FIG. 3 shows the planetary gearbox of the gas turbine engine, having a ring gear, a plurality of planet gears and a sun gear.

The planetary gearbox 30 is shown in greater detail by way of example in FIG. 3. Each of the sun gear 28, the planet gears 32 and the ring gears 38 comprise teeth on their periphery to allow intermeshing with the other gears. However, for clarity only exemplary portions of the teeth are illustrated in FIG. 3. Although three planet gears 32 are illustrated, it will be apparent to the person skilled in the art that a different number of planet gears 32, e.g. four planet gears, can be provided within the scope of protection of the claimed invention. Applications of an epicyclic planetary gearbox 30 generally comprise at least three planet gears 32.

Figure 6A:
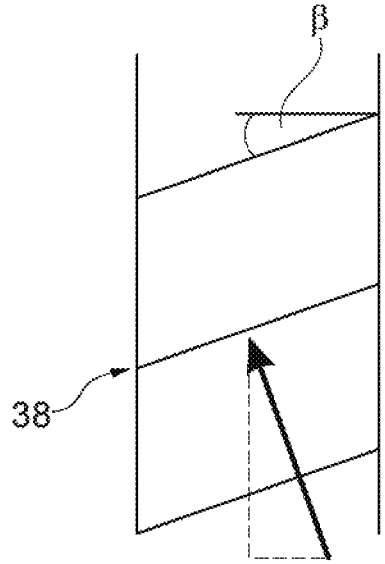
FIGS. 6A and 6B show views of the gearing of the ring gear of the planetary gearbox.
Figure 6B:
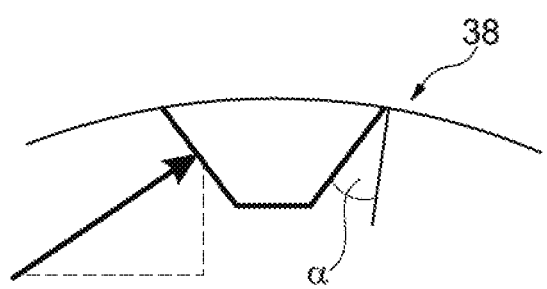

The force vectors K of the planet gears 32 on the ring gear 38 are also illustrated in FIG. 3. By virtue of the geometry of the helical gearing, in particular of the finite helix angle $\beta$ and the pressure angle $\alpha$ (see especially FIGS. 6A and 6B), the force vectors K have a radial component, an axial component and a component in the circumferential direction. The direction of the force vectors K is independent of the magnitude of the torque.

Figure 4:
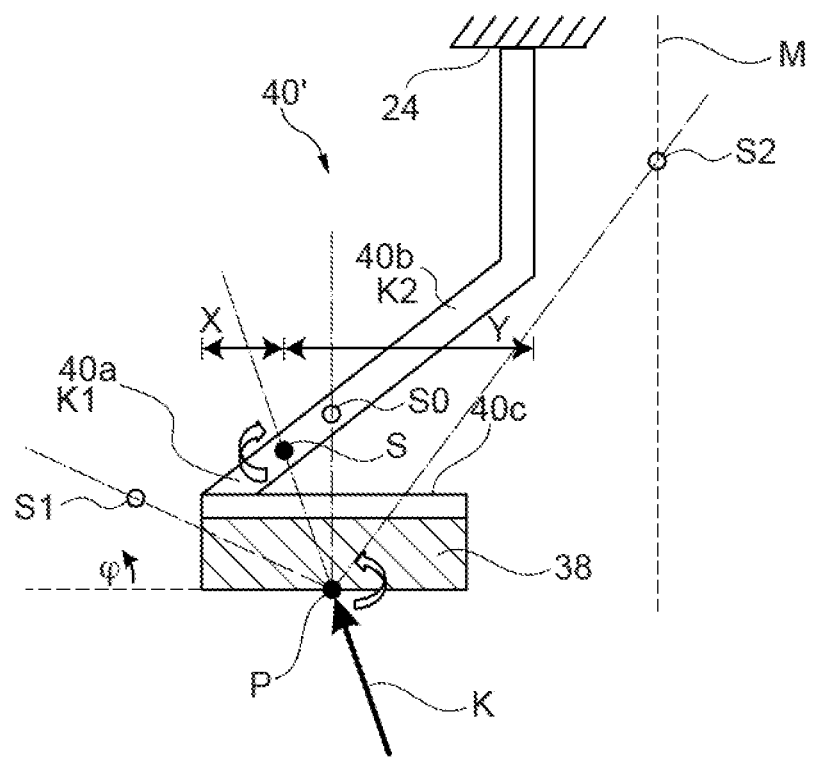
FIG. 4 shows a sectional view of the ring gear of the planetary gearbox and of a holding device.

FIG. 4 shows a view in accordance with cross section A-A in FIG. 3, wherein only one ring gear and one holding device 40' (to be specific one of two parts of the holding device 40') are illustrated.

The gearbox assembly shown in FIG. 2 can optionally include the holding device 40' shown in FIG. 4.

FIG. 4 shows the force vector K of the planet gear 32 on the ring gear 38 in a projection onto the cross-sectional plane (containing the central axis), i.e. with the radial and the axial force component but without the tangential component.

The holding device 40' shown in FIG. 4 comprises a first section 40a, which extends in the axial direction on one side of the force vector K and/or of a straight-line extension thereof (in the cross-section plane), and a second section 40b, which extends in the axial direction on the other side of the force vector K and/or of the straight-line extension thereof. The force of the planet gear 32 acts on a point P of the ring gear 38 which is arranged centrally on the ring gear 38 in the axial direction. At point P, the respective planet gear 32 is in engagement with the ring gear 38. In this context, force vector K is used to refer to the resultant of all the forces exerted by a planet gear 32 on the ring gear 38 at one position. The resultant force vector K thus acts centrally on the ring gear 38 in the axial direction.

To be specific, in a cross-sectional area or of the ring gear 38 (said cross-sectional area being generated by the central axis, corresponding to the main axis of rotation 9, and a radius), the first section 40a is arranged on one side of the force vector K (or of a straight-line extension thereof) projected onto the cross-sectional area, while the second section 40b is arranged on the other side of the force vector K (or of the straight-line extension thereof).

The force vector K (or the extension thereof) projected onto the cross-sectional area intersects the holding device 40' at a point of intersection S. If the planet gears 32 roll over the entire inner circumference of the ring gear 38, the point of intersection S of the accompanying force vector K describes a ring. The first section 40a of the holding device 40' extends on one side of the point of intersection S (and of the corresponding ring). The second section 40b extends on the other side thereof.

A ring section 40c of the holding device 40' surrounds the ring gear 38 and is connected in a fixed manner thereto.

In relation to the central axis of the ring gear 38, the first and the second section 40a, 40b are of oblique design, at least in some section or sections. The first and the second section 40a, 40b extend substantially over the entire width of the ring gear 38 in the axial direction. The holding device 40' can be mounted on the fixed structure on one side of the ring gear 38 in the axial direction, and the first section 40a adjoins the ring gear 38 on the other side in the axial direction. The holding device 40' thus overlaps the ring gear 38, at least approximately.

(In the cross section along the central axis of the ring gear 38), the first section 40a is connected at one end to the ring section 40c (optionally being formed integrally therewith or alternatively being mounted thereon, e.g. by means of flanges resting against one another). At its other end, the first section 40a is connected to one end of the second section 40b (once again optionally being formed integrally therewith or alternatively being mounted thereon). The second section 40b is connected at its other end to the fixed supporting structure 24 (likewise optionally being formed integrally therewith or alternatively being mounted thereon). In other words, it is possible, in particular, for the ring gear 38 to be connected via the first section 40a and the second section 40b (in this order) to the fixed supporting structure 24. As an option, the entire part comprising the holding device 40 (including the ring section 40c, the first and the second section 40a, 40b) is formed integrally.

The first section 40a and the second section 40b are flexible (as is optionally also the ring section 40c, particularly in the radial direction, which may improve the load distribution between the planet gears 32).

It is envisaged that the first and the second section 40a, 40b have rotational stiffnesses K1, K2, the ratio of which is 1.0+/−0.2, in particular 1.0+/−0.1, in particular 1.0+/−0.05 (alternatively, the first and the second section 40a, 40b have radial stiffnesses with these ratios). In the example shown, the ratio is 1.0. It is thereby possible to ensure that, despite the helical gearing, the forces of the planet gears 32 do not lead to tilting of the ring gear 38 but merely push the latter radially outwards. The ring gear is held horizontally. In other holding devices known to the applicant from the art, the displacement is composed of radial and axial components in accordance with the angle of the force vector. Owing to the identical or substantially identical rotational stiffnesses, especially around an axis perpendicular to the radius and to the central axis of the ring gear 38, the elastic rotations of the two sections (indicated by means of arrows in FIG. 4) balance each other out. A tilt angle φ disappears or is negligibly small (in particular irrespective of the load). It is thereby possible to reduce the stress on the teeth and to achieve enhanced robustness and reliability.

In the present case, the point of intersection S is arranged between a left-hand and a right-hand outer edge of the holding device 40' (when viewed in the axial direction). The point of intersection is spaced apart from the left-hand edge by a distance X and by a distance Y from the right-hand edge in the axial direction. The distance X (from the left-hand outer edge) is smaller than the distance Y (from the right-hand outer edge).

FIG. 4 furthermore depicts a plurality of further possible points of intersection S0, S1 and S2, which may result from gearing of different designs. Here, point of intersection S0 corresponds to the point of intersection in the case of spur gearing, and therefore point of intersection S0 lies in the same axial plane as point P.

Point of intersection S1 results from (steep-angled) helical gearing and is not arranged between the outer edges of the holding device 40' but in front of the left-hand edge. The distance between point of intersection S1 from the right-hand edge is thus greater than the distance between the two outer edges. In this case, the holding device would be shaped in such a way that the first and the second section 40a, 40b extended as far as this point of intersection S1.

Point of intersection S2 results from helical gearing with a force vector oriented inwards (towards the second ring gear 38). The gearing, in particular the helix angle, is designed and the holding device configured in such a way that point of intersection S2 lies in a central plane M. The central plane M is arranged in the center (in the axial direction) between the two ring gears 38 and extends perpendicularly to the central axis 9.

Figure 5:
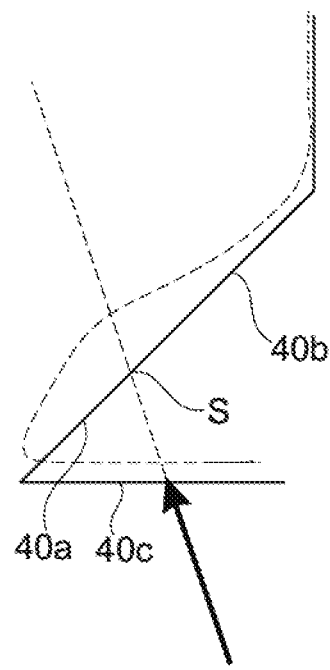
FIG. 5 shows deformations of the holding device shown in FIG. 4 owing to the action of a force due to a planet gear.

FIG. 5 shows schematically how the first section 40a and the second section 40b of the holding device 40 are deformed (elastically) as a result of the force exerted by a planet gear 32. Owing to the identical rotational stiffnesses of the first and the second section 40a, 40b, the ring section 40c is displaced in parallel in cross section, without being tilted.

In the present case, the first section 40a and the second section 40b are of different lengths in cross section (in the plane of the radius and of the central axis). In order to obtain identical rotational stiffnesses, one of the sections (namely the shorter first section 40a) can be formed from a softer material, for example, with weak points and/or with a smaller material thickness in comparison with the other one of the sections. In the present case, the first section 40a has a smaller material thickness than the second section 40b (see FIG. 4).

The rotational stiffnesses can be measured, for example, by holding fast the end of the respective section 40a, 40b which faces away from the other section 40a, 40b, exerting a torque on the point of intersection S and determining the deflection. This can optionally be performed by means of a piece cut out radially from the holding device 40'.

As an option, one or more through holes are formed in the first and/or the second section 40a, 40b to allow lubricating oil to pass through.

Figure 7:
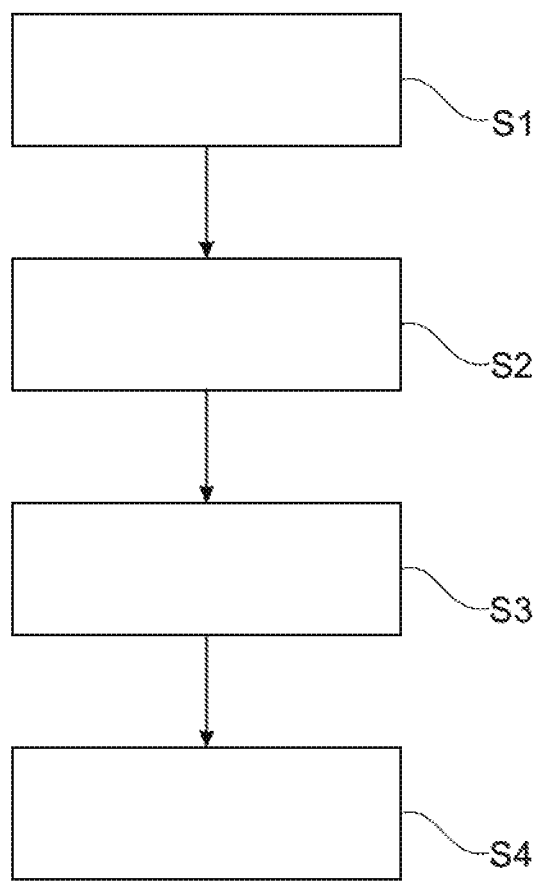
FIG. 7 shows a method for producing a gearbox assembly.

FIG. 7 shows a method for producing a gearbox assembly, in particular a gearbox assembly as described above. The steps can but do not necessarily have to be carried out in the order indicated below.

In a step S1, a planetary gearbox 30 having two ring gears 38 and a plurality of planet gears 32 is made available, wherein the planet gears 32 exert a force in the direction of a respective force vector K on each ring gear as they roll on the ring gear 38. Here, the force vector K represents the resultant of the forces which the respective planet gear 32 exerts in one position on the respective ring gear 38.

In a step S2, a geometry (in particular a material thickness) and/or material properties (in particular the selection of material, e.g. steel) of a first and a second section 40a, 40b respectively of a holding device 40; 40' for fastening the ring gears 38 on a fixed supporting structure 24 are determined in an optimization procedure. For this purpose, one or more of the parameters mentioned is varied with the aim of achieving rotational stiffnesses for the first and the second section 40a, 40b which are as far as possible the same.

In this case, the first and the second section 40a, 40b are defined by the fact that they are situated on opposite sides of the (revolving) force vector K in the axial direction. In relation to a radial cross section, the first and the second section 40a, 40b are defined by the axially opposite sides of the vector formed from the axial component and the radial component of the force vector K and by the straight-line extension thereof.

Once the planet gears 32 are rolling on the inner circumference of the ring gears 38, the accompanying force vector K and the straight-line extension thereof (for each ring gear 38) describe a cone, to be specific a right circular cone. This cone describes the transition between the first section 40a and the second section 40b.

As an option, the optimization procedure comprises an FEM algorithm and/or is performed iteratively.

In a step S3, the holding device 40; 40' is formed in accordance with the geometry determined.

In a step S4, the holding device 40; 40' is mounted on the ring gears 38, namely in such a way that (for each ring gear 38) the respective first and second sections 40a, 40b of the holding device 40; 40' are arranged on opposite sides, in the axial direction, of the force vector K and/or of the straight-line extension thereof, in particular exclusively on opposite sides. The gearbox assembly can be mounted on a gas turbine engine (e.g. the gas turbine engine shown in FIG. 1).

The epicyclic planetary gearbox 30 illustrated by way of example in FIGS. 2 and 3 is a planetary gearbox in which the planet carrier 34 is coupled to an output shaft via the linkage 36, with the ring gear 38 fixed. However, any other suitable type of planetary gearbox 30 may be used. By way of further example, the planetary gearbox 30 may be a star arrangement, in which the planet carrier 34 is held fixed, with the ring gear (or annulus) 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of protection of the present disclosure. Purely by way of example, any suitable arrangement can be used for positioning the planetary gearbox 30 in the gas turbine engine 10 and/or for connecting the planetary gearbox 30 to the gas turbine engine 10. By way of further example, the connections (such as the linkage 36 in the FIG. 2 example) between the gearbox 30 and other parts of the gas turbine engine 10 (such as the input shaft 26, the output shaft and/or the fixed structure 24) may have a certain degree of stiffness or flexibility. By way of further example, any suitable arrangement of the bearings between rotating and stationary parts of the gas turbine engine 10 (for example between the input and output shafts of the planetary gearbox and the fixed structures, such as the gearbox casing) may be used, and the disclosure is not limited to the exemplary arrangement of FIG. 2. Accordingly, the present disclosure extends to an engine, in particular a gas turbine engine having any arrangement of gearbox styles (for example star or epicyclic-planetary), support structures, input and output shaft arrangement, and bearing locations.

Optionally, the planetary gearbox 30 can drive additional and/or alternative components (e.g. the intermediate-pressure compressor and/or a booster compressor).

Other gas turbine engines to which the present disclosure may be applied may have alternative configurations. For example, engines of this kind may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

LIST OF REFERENCE SIGNS

9 Main axis of rotation and central axis of ring gear
10 Gas turbine engine
11 Core engine
12 Air intake
14 Low-pressure compressor
15 High-pressure compressor
16 Combustion device
17 High-pressure turbine
18 Bypass thrust nozzle
19 Low-pressure turbine
20 Core thrust nozzle
21 Engine nacelle
22 Bypass duct
23 Fan
24 Fixed supporting structure
26 Shaft
27 Interconnecting shaft
28 Sun gear
30 Planetary gearbox
32 Planet gear
34 Planet carrier
34a Bearing pin
34b Front planet carrier plate
34c Rear planet carrier plate
35 Spherical bearing
36 Linkage
38 Ring gear
40; 40' Holding device 40a First section
40b Second section
40c Ring section
A Core airflow
B Bypass airflow
K Force vector
M Center plane
P Point
S, S0-S2 Point of intersection
T1, T2 Part of the holding device
X, Y Distance

The invention claimed is:

1. A gearbox assembly for a gas turbine engine, comprising:
  a planetary gearbox including at least one ring gear and at least one planet gear, which exerts a force on the at least one ring gear in a direction of a force vector as the at least one planet gear rolls on the at least one ring gear; and
  a holding device for fastening the at least one ring gear on a supporting structure, the holding device including:
    a first section, which extends in an axial direction on one side of the force vector and/or is a straight-line extension of the force vector, the first section including a first end and a second end, and
    a second section, which extends in the axial direction on the other side of the force vector and/or is the straight-line extension of the force vector, wherein the second section is connected to the supporting structure;
    wherein the first section first end is connected to the at least one ring gear and the first section second end is connected to the second section such that the first section and the at least one ring gear are connected to the supporting structure via the second section;
    wherein the first section and the second section each have a rotational stiffness, wherein a ratio of the rotational stiffnesses is 1.0+/−0.1.

2. The gearbox assembly according to claim 1, wherein the ratio of the rotational stiffnesses is 1.0+/−0.05.

3. The gearbox assembly according to claim 1, wherein the planetary gearbox has helical gearing.

4. The gearbox assembly according to claim 3, wherein the at least one ring gear includes two ring gears in a double helical configuration such that axial forces are directed away from each other as the at least one planet gear rolls on the two ring gears.

5. The gearbox assembly according to claim 1, wherein the holding device provides a flexible suspension for the at least one ring gear.

6. The gearbox assembly according to claim 1, wherein the first section and the second section are formed integrally with one another or wherein the first section, the second section and the at least one ring gear are formed integrally with one another.

7. The gearbox assembly according to claim 1, wherein the first and the second section have different material thicknesses.

8. An aircraft engine, comprising:
  a core shaft;
  a fan having a plurality of fan blades; and
  the gearbox assembly according to claim 1 driven by the core shaft, wherein the fan is driven at a lower speed than the core shaft by the gearbox assembly.

9. A gas turbine engine for an aircraft, comprising:
  a core engine comprising a turbine, a compressor, and a core shaft connecting the turbine to the compressor;
  a fan, which is positioned upstream of the core engine, wherein the fan comprises a plurality of fan blades; and
  the gearbox assembly according to claim 1 driven by the core shaft, wherein the fan is driven at a lower speed than the core shaft by the gearbox assembly.

10. The gas turbine engine according to claim 9, wherein:
  the turbine is a first turbine, the compressor is a first compressor, and the core shaft is a first core shaft;
  the core engine further comprises a second turbine, a second compressor, and a second core shaft which connects the second turbine to the second compressor; and
  the second turbine, second compressor, and second core shaft are arranged to rotate at a higher speed than the first core shaft.

11. A method for producing a gearbox assembly, comprising the following steps:
  providing a planetary gearbox including at least one ring gear and at least one planet gear, which exerts a force on the at least one ring gear in a direction of a force vector as the at least one planet gear rolls on the at least one ring gear; and
  providing a holding device for fastening the at least one ring gear on a supporting structure, the holding device including:
    a first section, which extends in an axial direction on one side of the force vector and/or is a straight-line extension of the force vector, the first section including a first end and a second end, and
    a second section, which extends in the axial direction on the other side of the force vector and/or is the straight-line extension of the force vector, wherein the second section is connected to the supporting structure;
    providing that the first section first end is connected to the at least one ring gear and the first section second end is connected to the second section such that the first section and the at least one ring gear are connected to the supporting structure via the second section;
    providing that the first section and the second section each have a rotational stiffness, wherein a ratio of the rotational stiffnesses is 1.0+/−0.1.

12. The method according to claim 11, further comprising the following step:
  determining a geometry and/or material properties of the first section and of the second section of the holding device in an optimization procedure.

13. The method according to claim 12, and further comprising performing the optimization procedure using an FEM algorithm.

14. The method according to claim 12, and further comprising performing the optimization procedure iteratively.

15. The gearbox assembly according to claim 1, wherein the planetary gearbox has double helical gearing.

* * * * *